United States Patent
Hirokawa et al.

(10) Patent No.: US 6,524,061 B1
(45) Date of Patent: Feb. 25, 2003

(54) ARRANGEMENT FOR SEALING A STEAM-COOLED GAS TURBINE

(75) Inventors: Kazuharu Hirokawa, Takasago (JP); Katsunori Tanaka, Takasago (JP); Kazuo Uematsu, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 81 days.

(21) Appl. No.: 09/672,311

(22) Filed: Sep. 29, 2000

(30) Foreign Application Priority Data

Sep. 30, 1999 (JP) .......................................... 11-278439
Oct. 4, 1999 (JP) .......................................... 11-282490

(51) Int. Cl.⁷ ............................................. F01D 5/18
(52) U.S. Cl. ..................... 415/114; 415/116; 416/96 R; 403/335; 403/359.1; 277/630; 277/637
(58) Field of Search .................. 415/114–116; 416/95, 416/96 R, 96 A, 97 R, 198 A, 200 A, 201 R; 403/335, 359.1, 359.6; 277/510, 511, 525, 529, 520, 630, 637, 493, 496; 29/889, 889.21

(56) References Cited

U.S. PATENT DOCUMENTS

| | | | |
|---|---|---|---|
| 3,572,966 A | * | 3/1971 | Borden et al. .................. 416/95 |
| 4,453,889 A | * | 6/1984 | Sakata et al. ............ 416/198 A |
| 5,795,130 A | * | 8/1998 | Suenaga et al. ............... 416/95 |
| 6,065,282 A | * | 5/2000 | Fukue et al. ................. 415/115 |
| 6,095,751 A | | 8/2000 | Hirokawa et al. |
| 6,334,756 B1 | * | 1/2002 | Akiyama et al. ........... 415/116 |

FOREIGN PATENT DOCUMENTS

| | | |
|---|---|---|
| EP | 0 936 350 A2 | 8/1999 |
| JP | 11-050803 | 2/1999 |
| JP | 11-81910 | 3/1999 |
| JP | 11-229804 | 8/1999 |

\* cited by examiner

Primary Examiner—Christopher Verdier
(74) Attorney, Agent, or Firm—Oblon, Spivak, McClelland, Maier & Neustadt, P.C.

(57) ABSTRACT

There is provided a steam-cooled gas turbine with a plurality of blades cooled by a steam supplied from an external steam source. The rotor of the steam-cooled gas turbine is composed of a plurality of rotor disks connected by a plurality of spindle bolt extending through the rotor disks. The rotor includes a steam supply passage extending in the rotor, a steam supply chamber for distributing the steam to the respective blades, a steam recovery chamber for equally receiving the steam used for cooling the blades, and a steam recovery passage for directing the steam from the steam recovery chamber to the outside of the steam-cooled gas turbine. A sealing member in the form of substantially a ring, for sealing the steam leakage between the rotor and the spindle bolts, is disposed about each of the spindle bolts. The rotor includes recesses, disposed coaxially with the respective spindle bolt holes, for receiving the sealing members. A plurality of holding members holds the sealing members in place within the respective recesses by axially clamping the sealing members and engaging with the inner walls of the recesses.

24 Claims, 11 Drawing Sheets

ARRANGEMENT FOR SEALING A STEAM-COOLED GAS TURBINE

BACKGROUND OF THE INVENTION

1. Field of the Invention

The invention relates to a steam-cooled gas turbine and, in particular, to an arrangement for sealing spindle bolts of a steam-cooled gas turbine.

2. Description of the Related Art

In order to improve the efficiency of a gas turbine, the temperature of the combustion gas at the inlet of the gas turbine has recently been increased to 1,500 degrees Celsius. In order to protect the stator and the blades from the high temperature combustion gas, a so-called steam-cooled gas turbine, in which these elements are cooled by relatively low temperature steam, is under development. In such a steam-cooled gas turbine, steam is supplied from a steam source such as, for example, a steam extracting pipe in a steam turbine in a combined cycle or in an auxiliary boiler. In particular, the steam for cooling the blades of a gas turbine is supplied from a steam source through a steam passage formed to extend through the rotor to the respective blades fixed to the rotor.

The steam passage includes a plurality of steam supply passages longitudinally extending in the rotor from its tail end, an annular steam supply chamber, which is fluidicly connected to the plurality of steam supply passages, for distributing the steam equally to the respective blades, a steam recovery chamber for receiving the steam equally from the blades, and a plurality of steam recovery passages for directing steam from steam recovery chambers to the outside of the steam-cooled gas turbine.

FIG. 14 is a partial section of a rotor of a steam-cooled gas turbine according to a prior art turbine and shows first and second rotor disks 110 and 120 of a rotor 100. The disks 110 and 120 include a plurality of longitudinally extending spindle bolt holes 112 and 122 which are circumferentially arranged at intervals. The first and second rotor disks 110 and 120 are connected together with the other rotor disks (not shown) of the gas turbine by spindle bolts 102 inserted through the holes 112 and 122 so as to provide the integral rotating rotor 100 of the steam-cooled gas turbine.

The first and second rotor disks 110 and 120 further include a plurality of steam passages 114 and 124, circumferentially arranged at intervals, for supplying and recovering the steam for cooling the blades. The steam passages 114 and 124 are disposed in the peripheral portions of the rotor disks 110 and 120 radially outside of the holes 112 and 122. A plurality of steam supply conduits 104, which provide a steam supply passage for supplying the steam to the blades, and a plurality of steam recovery conduits 106, which provide a steam recovery passage for directing the steam used for cooling the blades to the outside of the steam-cooled gas turbine, are circumferentially alternatively provided in the steam passages 114 and 124.

A steam supply chamber 130, for equally distributing the steam to the primary blades (not shown), which are attached to the first rotor disk 110, is formed in the axially outer end face of the first rotor disk 110. A steam recovery chamber 132, for equally receiving the steam used for cooling the primary and secondary blades, is formed between the first and second rotor disks 110 and 120. Likewise, a steam supply chamber 134 for equally distributing the steam to the secondary blades is formed between the second rotor disk 120 and a third rotor disk (not shown).

In general, extracted steam from a low pressure steam turbine is used as cooling steam. The steam is supplied to the steam supply conduits 104, from which the steam is further supplied to the primary and secondary blades through the steam supply chambers 130 and 134. The steam used for cooling the primary and secondary blades is received by the steam recovery chamber 132 from which the steam is directed to the outside of the steam-cooled gas turbine through the steam recovery conduits 106.

The spindle bolt holes 112 and 124 have a diameter which is larger than the outer diameter of the spindle bolts to ensure the workability of assembly of the rotor by connecting the rotor discs to each other by spindle bolts. Therefore, relatively large gaps result between the spindle bolt holes and the spindle bolts. On the other hand, the steam recovery chambers 132 and 134 which are formed in the rotor are fluidly connected to the spindle bolt holes 112 and 122 so that steam leaks through the gaps between the first and second rotor discs 110 and 120 and the spindle bolts 102 result. The steam leakage through the gaps between the secondary rotor disc 120 and the spindle bolts 102 flows into the steam recovery chamber 132 so that it can be recovered through the steam recovery conduits 106. However, the steam leakage through the gaps between the first rotor disc 110 and the spindle bolts 102 cannot be recovered, which decreases the overall efficiency of a plant which utilizes the steam-cooled gas turbine.

In order to reduce the steam leakage through the gaps between the first rotor disc 110 and the spindle bolts 102, in the prior art, for example Japanese Unexamined Patent Publication No. 11-50803, annular sealing members 140, as shown in FIGS. 14 and 15, are provided. Snap rings 142 are used as a fastener for securing the sealing members 140 to the first rotor disk 110. The snap rings 142 are fitted in grooves 116 which are formed in the first rotor disc 110. When the rotor rotates, the centrifugal force applied thereto results in deformations in the respective snap rings 142, which in particular reduces the diameter of the snap rings 142, which may result in detachment of the snap rings 142 from the grooves 116.

As shown in FIG. 14, the steam supply chamber 130 is provided at one of the ends of the rotor 100, which end is disposed in the central portion of the steam-cooled gas turbine. The steam leakage from the steam supply chamber 130 may result in a problem of condensation around the bearings in the central portion of the steam-cooled gas turbine. Therefore, a severe sealing arrangement around the steam supply chamber 130 is required. Further, in order to allow inspection or the execution of maintenance in the steam supply chamber 130, a simple sealing arrangement is desired.

SUMMARY OF THE INVENTION

The invention is directed to solve the prior art problems, and to provide a steam-cooled gas turbine improved to prevent the detachment of the fastener.

Another objective of the invention is to provide an arrangement for sealing or reducing the steam leakage through the gap between the first rotor disk and the spindle bolts, which arrangement is improved to prevent the detachment of the fastener for securing the sealing members to the first rotor disk.

Another objective of the invention is to provide a method of assembling such steam-cooled gas turbine.

Another objective of the invention is to provide a steam-cooled gas turbine which includes a steam chamber closed by a closure which can be assembled easily.

The invention provides a steam-cooled gas turbine with a plurality of blades cooled by steam supplied from an external steam source. The steam-cooled gas turbine has a rotor for supporting the blades. The rotor is composed of a plurality of rotor disks which includes a plurality of spindle bolt holes circumferentially arranged at intervals and spindle bolts extending through the spindle bolt holes to connect the plurality of rotor disks to each other to define the rotor. The rotor includes a steam supply passage extending in the rotor, a steam supply chamber, fluidly connected to the steam supply passage and the respective blades, for distributing the steam to the respective blades from the steam source through the steam supply passage, a steam recovery chamber, fluidly connected to the respective blades, for equally receiving the steam used for cooling the blades, and a steam recovery passage, fluidly connected to the steam recovery chamber, for directing the steam from the steam recovery chamber to the outside of the steam-cooled gas turbine. A sealing member substantially in the form of a ring, for sealing the steam leakage between the rotor and the spindle bolts, is disposed about each of the spindle bolts. The rotor disk includes recesses, disposed coaxially with the respective spindle bolt holes, for receiving the sealing members. Each of the recesses has an annular bottom wall and an inner wall connected to the bottom wall. The inner wall has a diameter larger than that of the spindle bolt hole. A plurality of holding members holds the sealing members in place within the respective recesses by axially clamping the sealing members and engaging with the inner walls of the recesses.

According to another feature of the invention, there is provided an arrangement for sealing between spindle bolts and a rotor of a steam-cooled gas turbine. The steam-cooled gas turbine has a plurality of blades cooled by steam, and a rotor for supporting the blades. The rotor is composed of a plurality of rotor disks which includes a plurality of spindle bolt holes circumferentially arranged at intervals and spindle bolts extending through the spindle bolt holes to connect the plurality of rotor disks to each other to define the rotor. The rotor includes a steam supply passage extending in the rotor, a steam supply chamber, fluidly connected to the steam supply passage and the respective blades, for distributing the steam to the respective blades from the steam source through the steam supply passage, a steam recovery chamber, fluidly connected to the respective blades, for equally receiving the steam from the respective blade used for cooling the blades, and a steam recovery passage, fluidly connected to the steam recovery chamber, for directing the steam from the steam recovery chamber to the outside of the steam-cooled gas turbine. The arrangement has a sealing member in the form of substantially a ring, disposed about the respective spindle bolts, for sealing the steam leakage between the rotor and the spindle bolts. The rotor includes recesses, disposed coaxially with the respective spindle bolt holes, for receiving sealing members, each of the recesses having an annular bottom wall and an inner wall connected to the bottom wall, the inner wall having a diameter larger than that of the spindle bolt hole. A plurality of holding members holds the sealing members in place within the respective recesses by axially clamping the sealing members and engaging with the inner walls of the recesses.

According to another feature of the invention, there is provided a method of assembling an arrangement for sealing between spindle bolts and a rotor of a steam-cooled gas turbine. The steam-cooled gas turbine has a plurality of blades cooled by a steam, and a rotor for supporting the blades. The rotor is composed of a plurality of rotor disks which includes a plurality of spindle bolt holes circumferentially arranged at intervals and spindle bolts extending through the spindle bolt holes to connect the plurality of rotor disks to each other to define the rotor. The rotor includes a steam supply passage extending in the rotor, a steam supply chamber, fluidly connected to the steam supply passage and the respective blades, for distributing the steam to the respective blades from the steam source through the steam supply passage, a steam recovery chamber, fluidly connected to the respective blades, for equally receiving the steam from the respective blade used for cooling the blades, and a steam recovery passage, fluidly connected to the steam recovery chamber, for directing the steam from the steam recovery chamber to the outside of the steam-cooled gas turbine. The method includes the steps of disposing annular sealing members about the respective spindle bolts to abut the bottom walls of the respective recesses; disposing first holding members within the respective recesses from the axially outside of the sealing members to abut the sealing members; disposing fastener members between the respective first holding members and the recesses; disposing second holding member within the respective recesses from the axially outside of the fastener members to axially clamp the fastener members together with the first holding members.

According to another feature of the invention, there is provided a steam-cooled gas turbine with a plurality of blades cooled by steam supplied from an external steam source. The steam-cooled gas turbine has a rotor for supporting the blades. The rotor is composed of a plurality of rotor disks which includes a plurality of spindle bolt holes circumferentially arranged at intervals and spindle bolts extending through the spindle bolt holes to connect the plurality of rotor disks to each other to define the rotor. The rotor includes a steam supply passage extending in the rotor, a steam supply chamber, fluidly connected to the steam supply passage and the respective blades, for distributing the steam to the respective blades from the steam source through the steam supply passage, a steam recovery chamber, including an annular recess defined in the high pressure side end face of the rotor to be fluidly connected to the respective blades, for equally receiving the steam from the respective blade used for cooling the blades, and a steam recovery passage, fluidly connected to the steam recovery chamber, for directing the steam from the steam recovery chamber to the outside of the steam-cooled gas turbine. A catch in the form of radially outwardly extending portions is integrally connected to the rotor to be arranged alternatively along substantially the inner periphery of the opening of the annular recess. A closure in the form of substantially a ring is provided for closing the opening of the annular recess. An engaging portion in the form of radially inwardly extending portions alternatively is arranged along the inner periphery of the closure. The closure is attached to the rotor by the engagement between the catch and the engaging portions.

DESCRIPTION OF THE DRAWINGS

These and other objects and advantages and further description will now be discussed in connection with the drawings in which.

DESCRIPTION OF THE PREFERRED EMBODIMENTS

Figure 1:
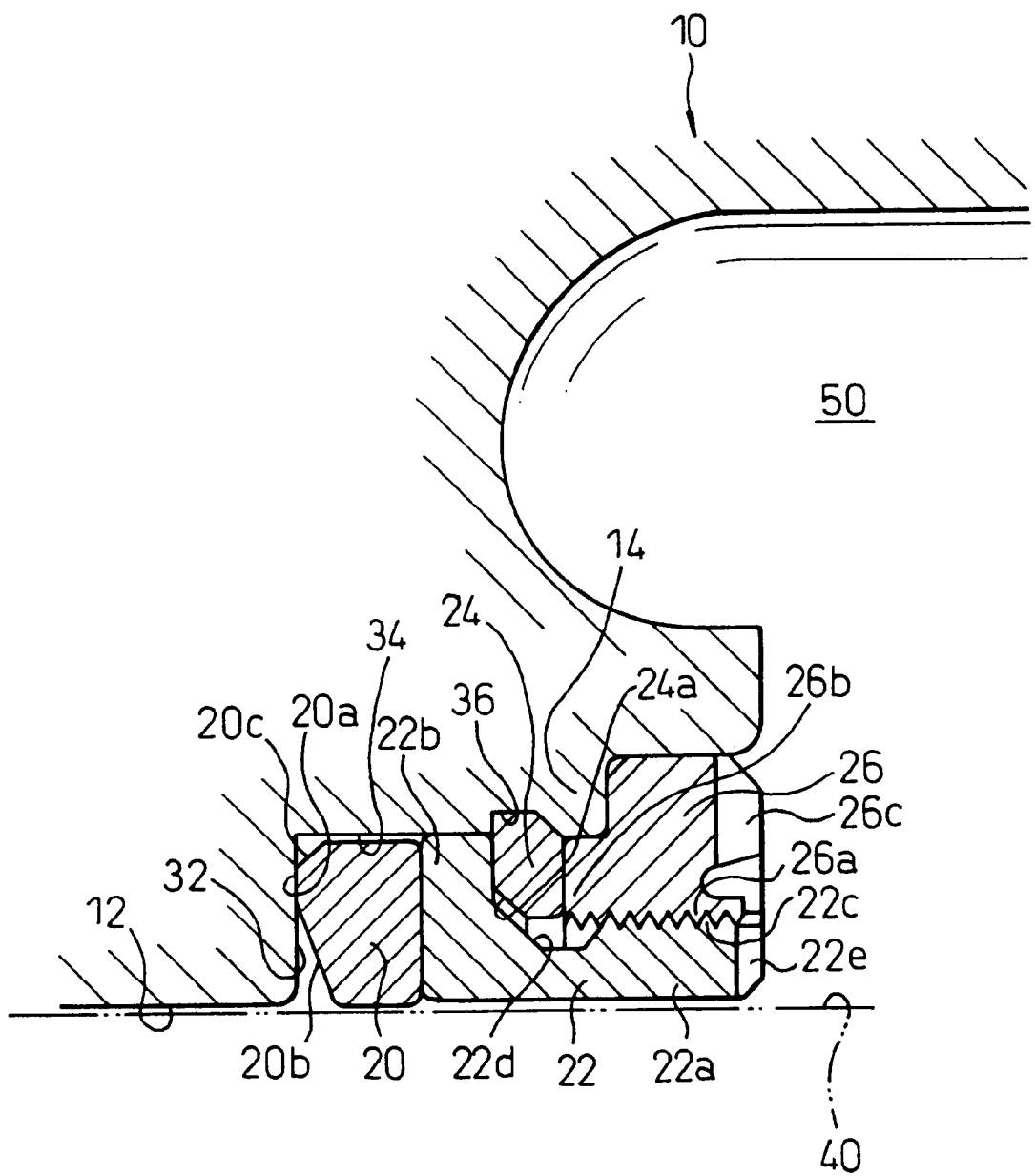
FIG. 1 is a partial section of a first rotor disk of a steam-cooled gas turbine with a spindle bolt extending through the first rotor disk according to the embodiment of the invention.
Figure 2:
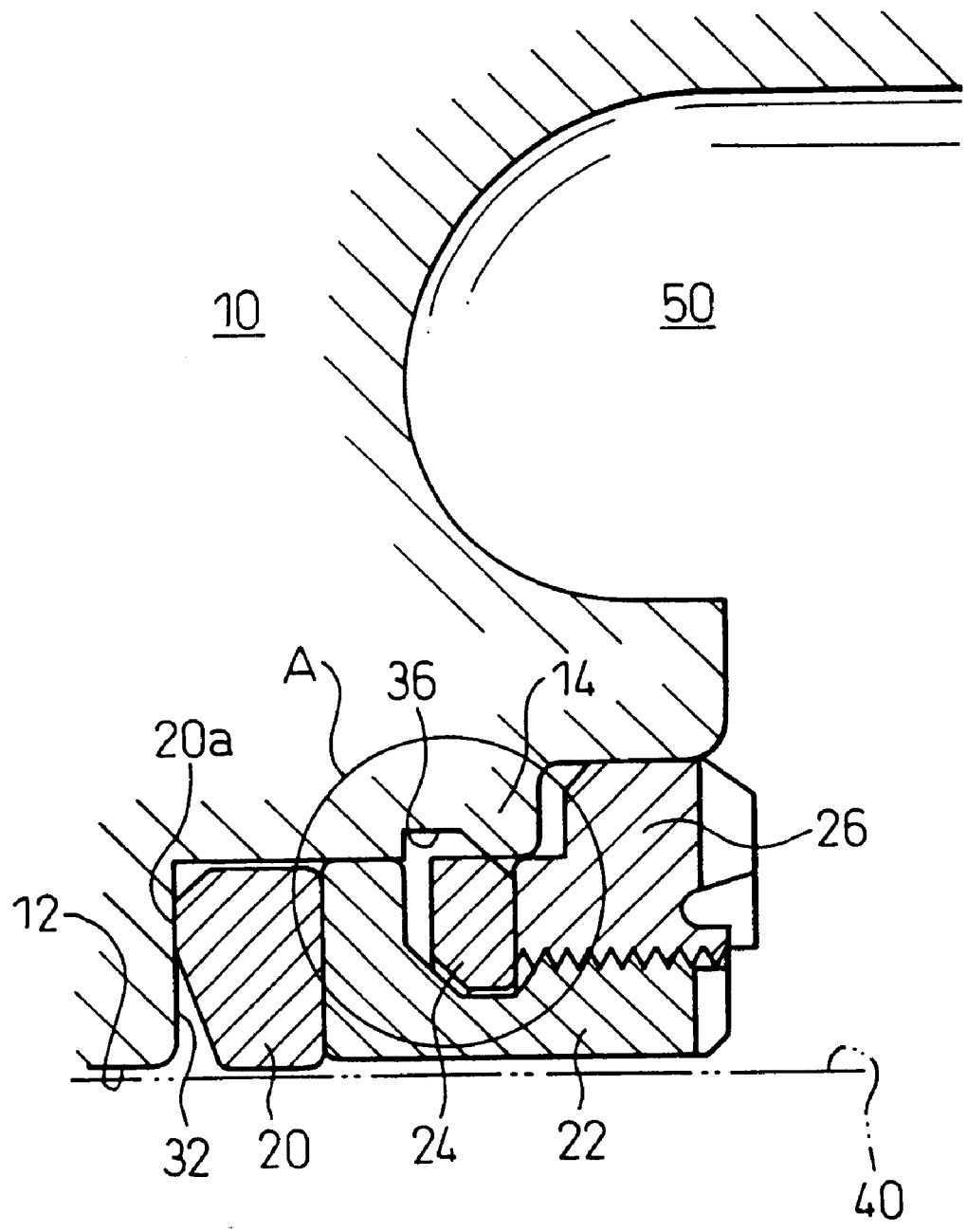
FIG. 2 is a partial section of the first rotor disk similar to FIG. 1 for explaining the assembly of the holding member.
Figure 3:
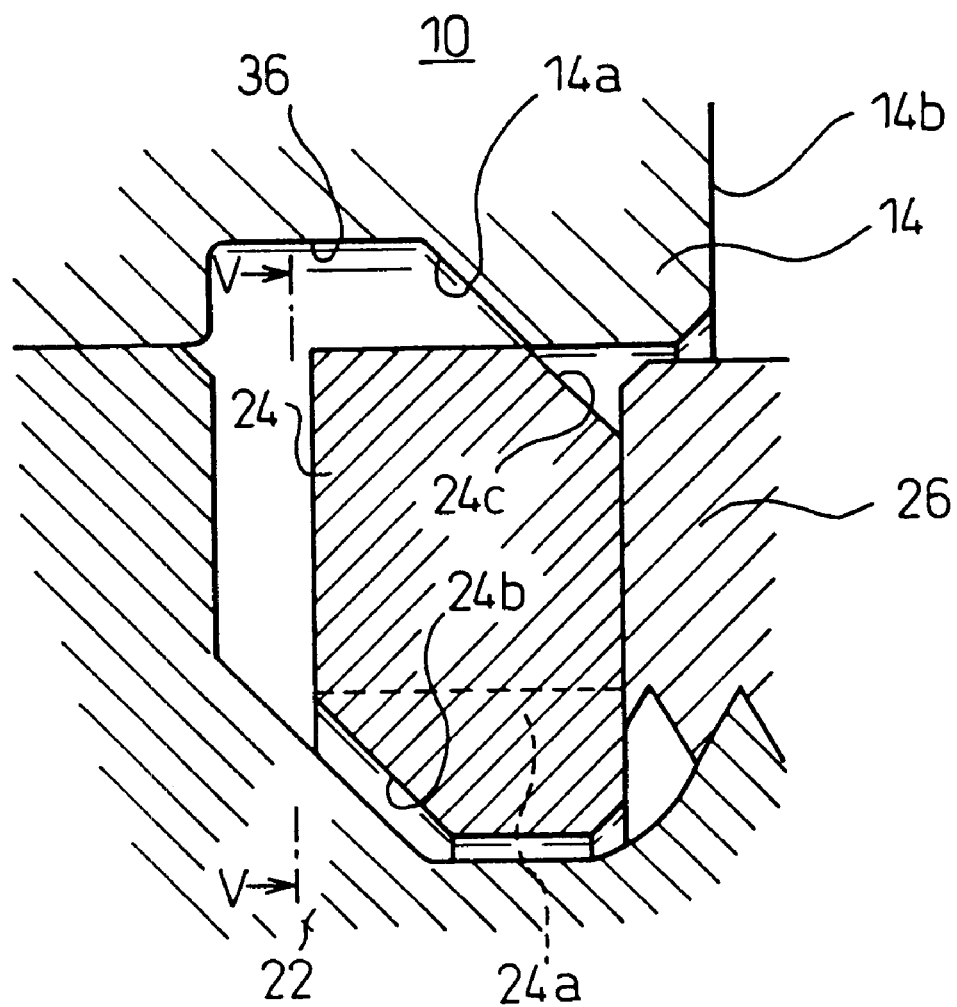
FIG. 3 is an enlarged section of a portion indicated by "A" in FIG. 2.
Figure 4:
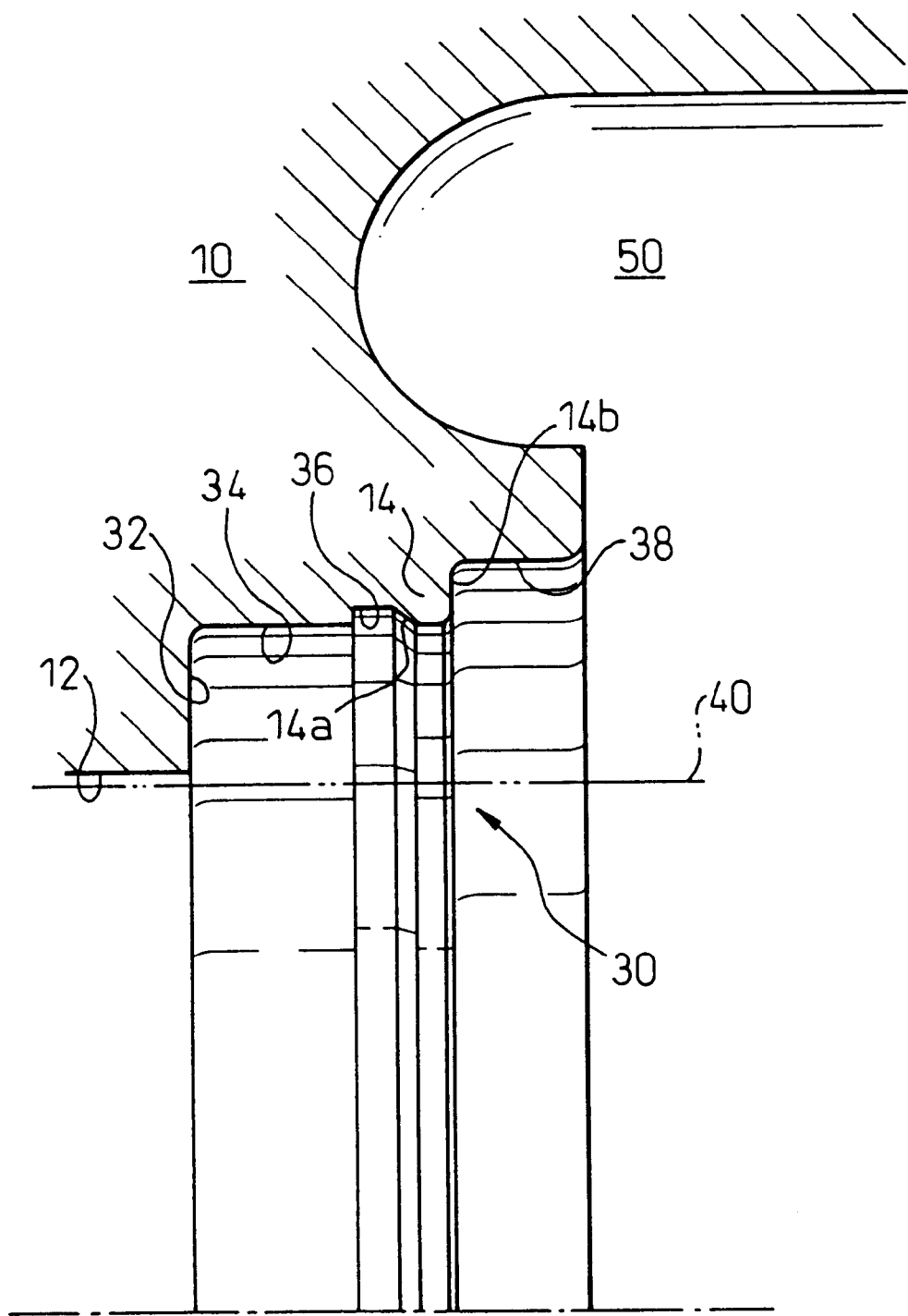
FIG. 4 is a partial sectional view of the first rotor disk according to the embodiment of the invention.

A preferred embodiment of the invention will be described hereinafter. The following description is mainly directed to the primary rotor disc, and the configuration of the remaining rotor discs are the same as the prior art.

FIGS. 1–4 are partial sections of a first rotor disc 10 according to the embodiment of the invention. The first rotor disc 10 includes a plurality of through holes 12, which are fluidly connected to a steam recovery chamber 50 provided between the primary rotor disc 10 and a secondary rotor disc (not shown). The inner end face of the first rotor disk 10, which end face partially defines the steam recovery chamber 50, includes a plurality of spot facings or recesses 30 (refer to FIG. 4). The recesses 30 have bottoms 32 and side walls and are coaxial with the corresponding through holes 12 so that the respective recesses 30 enclose the corresponding end openings of the through holes 12 to receive sealing members 20 in the form of rings. In addition to the sealing member 20, a securing member 22, 24 and 26, for securing the sealing member 20, is disposed within each of the recesses 30. The securing member is composed of a first securing member which defines a threaded bolt, second securing member 26 which provides a nut engaging the threaded bolt, and an engaging member 24 clamped between the first and second securing members 22 and 26.

Each of the recesses 30 is formed into a substantially cylindrical recess having an annular bottom wall 32 and a side wall connected to the bottom wall. The recess 30 includes a first accommodating portion 34 defined by the bottom wall 32 and a portion of the side wall adjacent to a bottom 32, a second accommodating portion 36 in the form of an annular groove adjacent to the first accommodating portion 34, a radially inwardly extending annular mooring portion 14, and a third accommodating portion 38 adjacent to the opening of the recess 30. The first, second and third accommodating portions 34, 26 and 38 comprise the side wall of the recess 30.

The sealing member 20 is disposed about the spindle bolt 40 within the first accommodating portion of the recess 30 to contact the bottom wall 32. The sealing member 20 has including first and second end faces which are axially apart from each other, and inner and outer peripheries connected to the first and second end faces. The sealing member 20 further has inner and outer tapered faces 20b and 20c which extend between the first end face and the inner and outer peripheries whereby the area of first end face is reduced to define an annular sealing surface 20a between the first and second tapered faces 20b and 20c. The reduction of the area of the first end face increases the pressure between the bottom wall 32 and the sealing surface 20a abutting the bottom wall 32. This increases the sealing effect between the bottom wall 32 and the sealing member 20.

The first holding member 22 includes a cylindrical portion 22a, which has a outer screw thread 22c, and a flanged portion 22b integrally connected to the end of the cylindrical portion opposite to the outer screw thread 22c. The flanged portion provides an abutment or a clamping portion. A tapered face 22d is defined between the cylindrical portion 22a and the flanged portion 22c. The cylindrical portion 22a further has a slit 22e for engagement with a tool or a jig for assembly of the first holding member.

The second holding member 26 comprises an annular member which has an inner screw thread engaging the outer screw thread of the first holding member 22. The second holding member 26 defines an axially inwardly extending clamping portion 26b which is disposed at the central portion of the end face of the annular member. Further, the second holding member 26 has a slit 26c for engagement with a tool or a jig for assembly of the second holding member.

Figure 5:
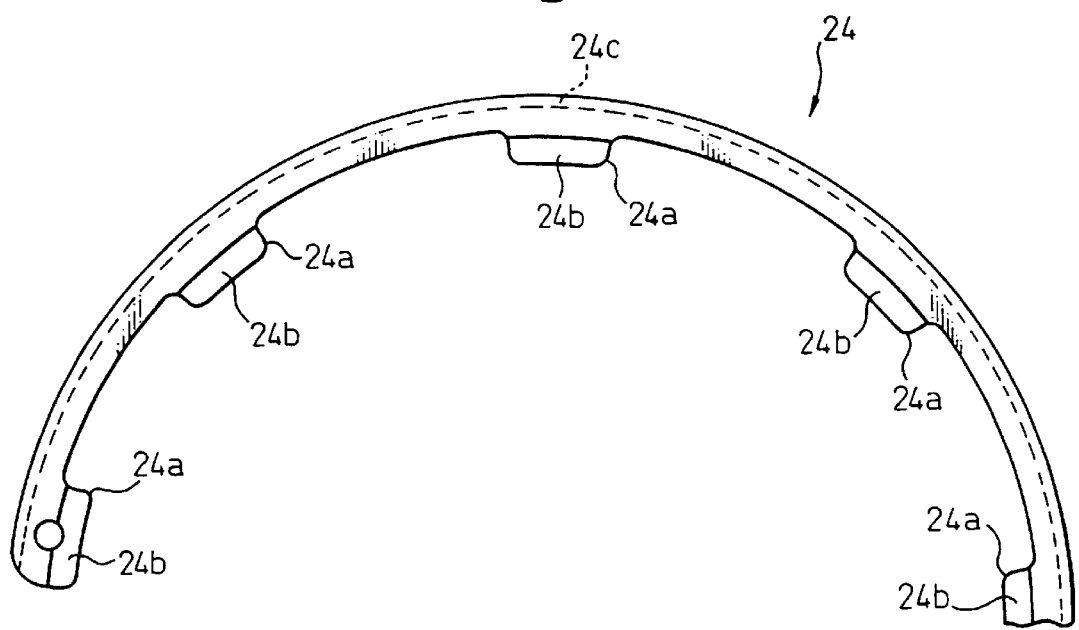
FIG. 5 is partial front view, taken along arrows V—V in FIG. 3, of an fastener member in the form of a C-shaped member.

With reference to FIG. 5, the fastener member 24 substantially comprises a C-shaped member, resembling a C-shaped snap ring. The fastener member 24 includes a plurality of protrusions 24a disposed at an interval along the inner periphery of the fastener member 24. The protrusions 24a define inner tapered faces 24b which are disposed opposite to the tapered face 22d of the first holding member 22 when the fastener member 24 is assembled to the first rotor disk 10. The fastener member 24 further includes a outer tapered face 24c which is disposed diagonally opposite to the inner tapered faces 24b and extends along the outer periphery of the fastener member 24 to engage the tapered face 14a of the mooring portion 14.

The operational function of the sealing member 20 will be described by following the assembling process.

After the spindle bolt 40 is inserted into one of the spindle holes 12 of the first rotor disk 10, the sealing member 20 is fitted onto the spindle bolt 40 so that the sealing member 20 is disposed in the first accommodating portion 34 of the recess 30 to contact the bottom wall 32 of the recess. Then, the first holding member 22 is fitted onto the spindle bolt 40 from axially outside of the sealing member 20, which is already put in the first accommodating portions 34, to be disposed in the recess 30 so that the clamping portion 22b of the first holding member 22 abuts the sealing member 20. Next, the C-shaped fastener member 24 is fitted onto the spindle bolt 40 to be disposed into the second accommodating portion 36 and to contact the outer surface of the first holding member 22. Finally, the inner screw thread 26a of the second holding member 26 is engaged the outer screw thread 22c of the first holding member 22 to tighten the second holding member 26 to the first holding member 22.

Tightening the second holding member 26 makes the clamping portion 26a of the second holding member 26 abut the fastener member 24 (FIGS. 2 and 3), which presses the fastener member 24 into the recess 30. During this process, the fastener member 24 expands radially outwardly with the tapered face 24 defined along the outer periphery of the fastener member 24 engaging the tapered face 14a of the mooring portion 14. Once the tightening of the second holding member 26 to the first holding member 22 is completed, the C-shaped fastener member 24 is fitted in the second accommodating portion 36 and axially clamped between the clamping portions 22b and 26b of the first and second holding members 22 and 26. This results in an integrated holding member composed of first holding member 22, the C-shaped fastener member 24 and the second holding member 26. Engagement between the tapered faces 24c and 14a of the fastener member 24 and the mooring portion 14 locks the integrated holding member in the recess 30. In order to prevent looseness between the first and second holding members 22 and 26, the first and second holding members 22 and 26 may be crimped together at the ends where the slits 22e and 26c are defined.

After all of the rotor disks are connected by the spindle bolts 40, when the steam-cooled gas turbine is actuated, the sealing member 20 is pressed to the bottoms 32 of the recesses 30 by the pressure of the steam in the steam recovery chamber 50 used for cooling the primary and secondary blades since the recesses 30 defined in the first rotor disk 10 are fluidly connected to the steam recovery chamber 50.

In general, elements of a high temperature rotary machine such as a gas turbine are machined with sufficient allowance for the thermal expansion when the temperature of the machine is raised. In the present embodiment, the inner and outer diameters of the sealing member 20 also include such an allowance to prevent the substantial contact between the outer and inner peripheral surfaces of the sealing member 20 and the inner and outer peripheral surfaces of the first accommodating portion 34 and the spindle bolt 40. When the rotor rotates after the steam-cooled gas turbine is actuated, the spindle bolts 40 radially outwardly bend due to the centrifugal force whereby the sealing members 20 and the holding members 22, 24 and 26 are radially outwardly moved. At this time, the sealing members 20 are pressed to the bottom walls 32 of the respective recesses 30 by the steam pressure in the steam recovery chamber 50 to prevent the steam leakage between the outer peripheral surfaces of the sealing members 20 and the inner peripheral surfaces of the first accommodating portions 34. The steam leakage between the sealing members 20 and the spindle bolts 40 is reduced by the sealing members 20 (but not be completely prevented).

In the embodiment, the sealing member 20 is held by the holding members 22, 24 and 26. On the other hand, in the prior art, a sealing member is held only by a C-shaped snap ring, as described above. The C-shaped snap ring deforms due to the centrifugal force when the rotor rotates which may result in detachment of the snap ring. According to the embodiment, the C-shaped fastener member 24 is axially clamped and held by the first and second holding members 22 and 26, which prevents the deformation of the fastener member 24. The degree of deformation of the fastener member 24 depends on the degree of the centrifugal force on the fastener member 24 and the frictional force between the fastener member 24 and the first and second holding members 22 and 26. Therefore, depending on the manufacturing error, reduction of the frictional force between the fastener member 24 and the first and second holding members 22 and 26 may occur and centrifugal deformation of the fastener member 24 will result. According to the embodiment, even in such a case, the tapered faces 24b defined in the inner periphery of the fastener member 24 abut the second tapered face 22d of the first holding member 22 to stop the progress of the deformation of the fastener member 24. This prevents the detachment of the fastener member 24 from the mooring portion 14.

With reference to FIGS. 6–13 a preferred embodiment of the steam supply chamber of the invention will be described hereinafter.

Figure 6:
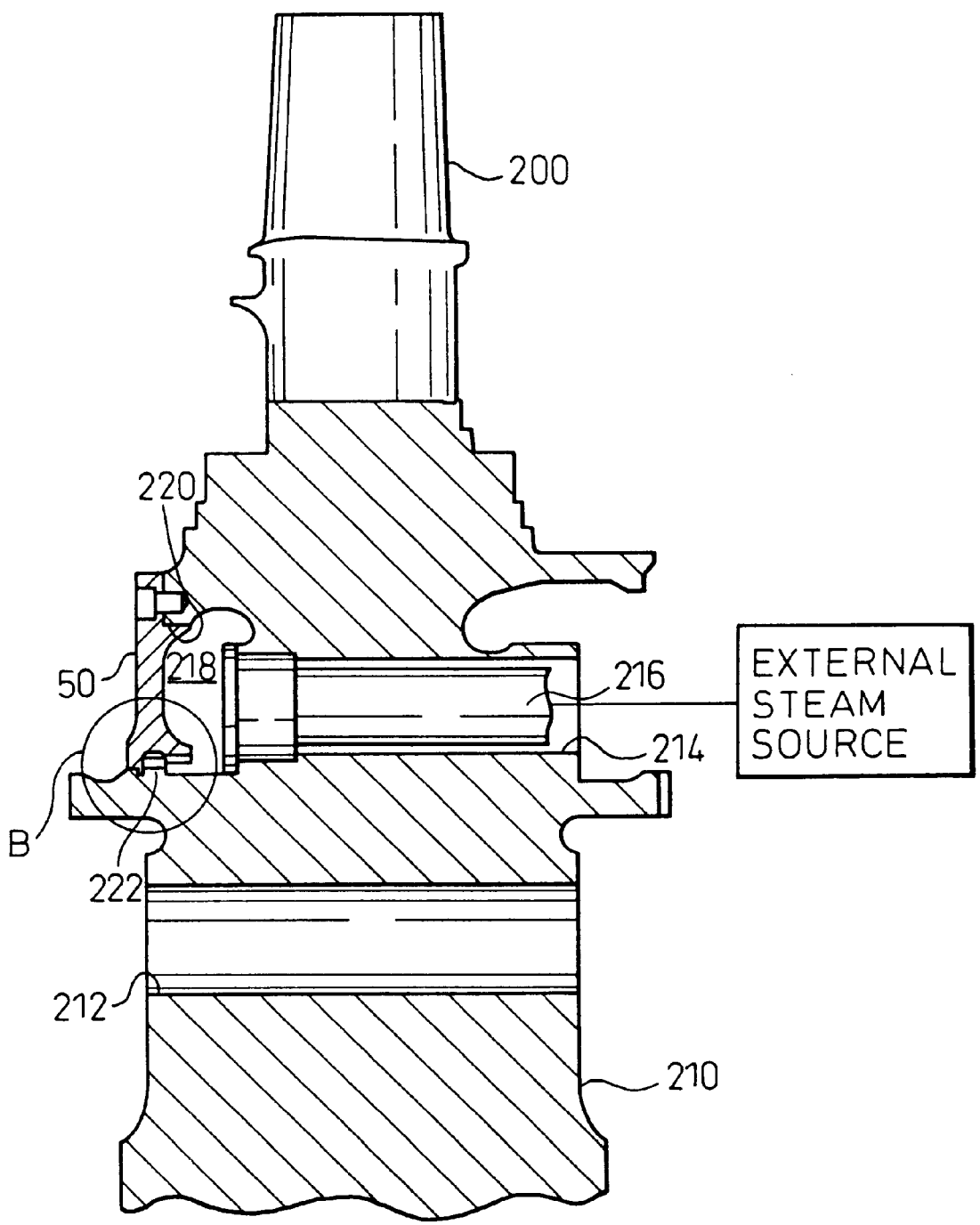
FIG. 6 is a partial section of a first rotor disk, showing a steam supply chamber according to an embodiment of the invention.
Figure 7:
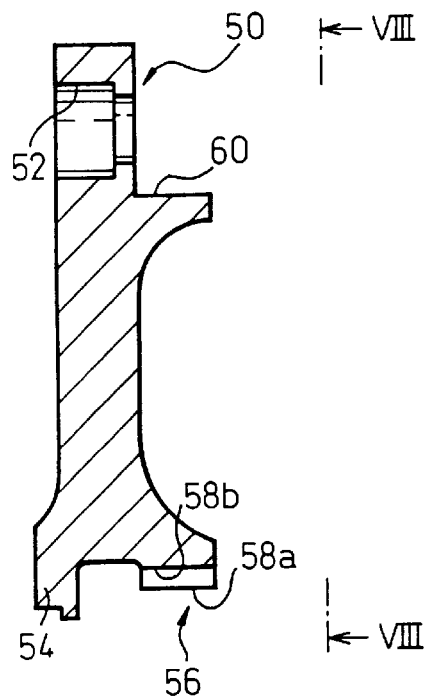
FIG. 7 is a partial section of a closure according to the embodiment of the invention.

FIG. 6 is a partial section of a first rotor disk 210 which supports primary blades 200, that are the highest pressure blades, of a steam-cooled gas turbine to which the present invention is applied. In FIG. 6, second, third and fourth rotor disks (not shown) which support secondary, tertiary and quaternary blades are arranged to the right, in FIG. 6, in this order. The first rotor disk 210 has a plurality of spindle bolt holes 212 circumferentially arranged at intervals. Spindle bolts (not shown) are inserted through the spindle bolt holes 212 of the first rotor disk 210 and the corresponding spindle bolt holes (not shown) of the second, third and fourth rotor disks. An integrated rotor is provided by connecting the first to fourth rotor disks with the spindle bolts.

In the first rotor disk 210, the peripheral portion, which is radially outward from the spindle bolts 112, defines a plurality of steam passages 214. The steam passages 214 are also circumferentially arranged at intervals. Steam supply conduits 216, which provide steam supply passages, are inserted through the steam passages 214 and the corresponding steam passages (not shown) of the second to fourth rotor disks when the first to fourth rotor disks which are connected to each other by the spindle bolts. In FIG. 6, the steam passages 214 open into a steam supply chamber 218 in the form of an annular recess defined in the high pressure side end face (left side in FIG. 6) of the first rotor disk which is adjacent to the compressor (not shown) incorporated in the gas turbine. The end of each steam supply conduit 216 is fixed to the first rotor disk 210 by a fastener to open into the steam supply chamber 218. In the inner surface of the steam supply chamber 218, a sealing surface 220 is defined along the radially outer periphery of the opening of the steam supply chamber 218. Catch 222 is defined along the radially inner periphery of the opening. The opening of the steam supply chamber 218 is sealingly closed by a closure 50 substantially in the form of a ring, as described hereinafter.

The steam for cooling the primary blades 200 is supplied from a steam source such as an extracting pipe of a low pressure steam turbine (not shown) through the steam conduits 216 to the steam supply chamber 218. From the steam supply chamber 218, the steam is supplied to the primary rotor disk 200 through passages (not shown) defined in the first rotor disk 210.

The closure 50 has a sealing surface 60, defined in the rear or inner end face of the closure 50 adjacent to the bolt holes 52. The sealing surface 60 sealingly engages the sealing surface 220 of the steam supply chamber 218. The closure 50 includes an apron 54, which is positioned at the front side when the closure 50 is attached to the first rotor disk 210, and an engaging portion 56 positioned at the rear side. The engaging portion 56 engages the catch 222 of the steam chamber 218.

Figure 8:
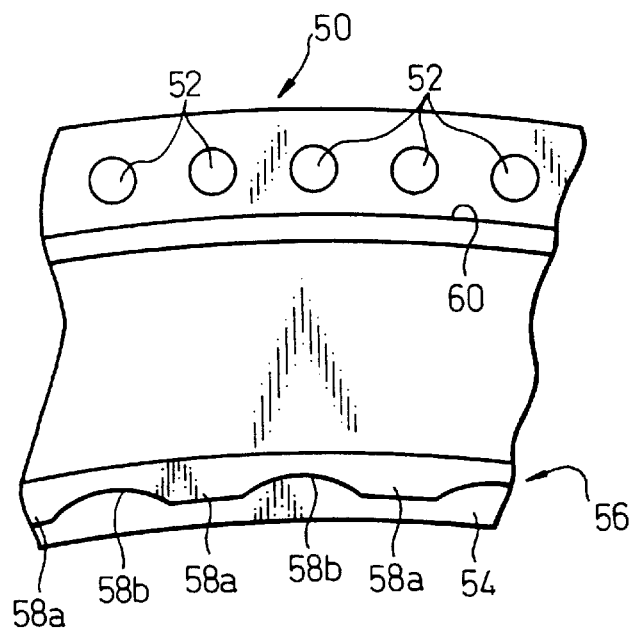
FIG. 8 is a partial front view, in arrows VIII—VIII in FIG. 7.
Figure 9:
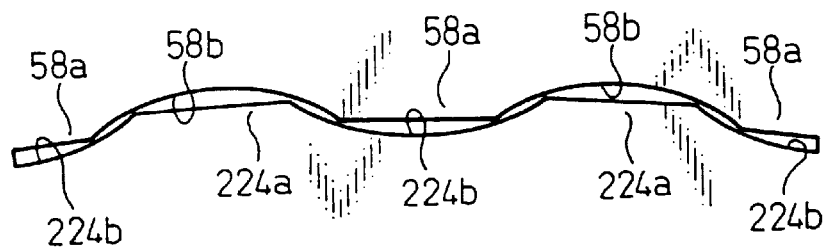
FIG. 9 is a schematic partial enlarged rear view of an engaging portion of the closure and a catch of the first rotor disk which are disengaged from each other.
Figure 10:
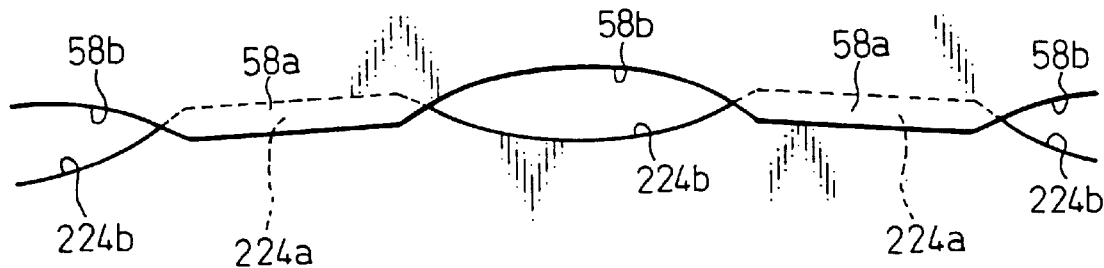
FIG. 10 is a schematic partial enlarged rear view of the engaging portion and the catch which are engaged with each other.
Figure 11:
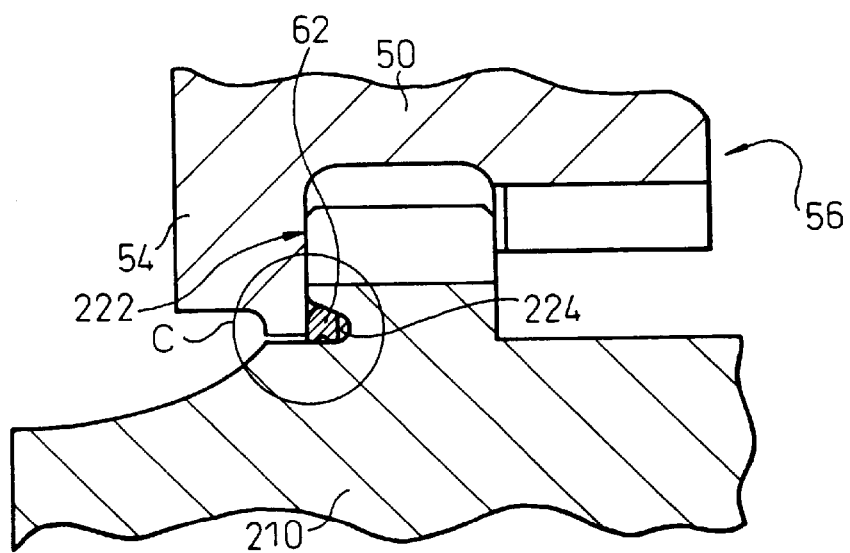
FIG. 11 is an enlarge view of a portion indicated by "B" in FIG. 6.

With reference to FIGS. 8–10, the closure 50 defines a plurality of radially extending portions 58a and 58b which are regularly configured along the inner periphery. The engaging portion 56 is provided by the radially inwardly extending portions 58a and 58b. On the other hand, the first rotor disk 210 includes a plurality of radially outwardly extending portions 224a and 224b which are disposed adjacent to the opening of the steam supply chamber 218. The radially outwardly extending portions 224a and 224b are correspondingly configured to the radially inwardly extending portions 58a and 58b of the closure 50. The catch 222 is provided by the radially outwardly extending portions 224a and 224b.

When the closure 50 is attached, the closure 50 is positioned relative to the rotor disk 50 so that the radially inwardly extending portions 58a and 58b of the closure 50 are overlapped to the radially outwardly extending portions 224b and 224a, respectively. The closure 50 is moved axially rearwardly (i.e. to the right in FIGS. 1 and 6) so that the apron 54 of the closure 50 abuts the catch 222 of the first rotor disk 210. Next, the closure 50 is rotated in the clockwise or counter clockwise direction so that the engaging portion 56 of the closure 50 engage the catch 222. Then, bolts are inserted into the bolt holes 52 to secure the closure 50 to the first rotor disk 210.

Figure 13:
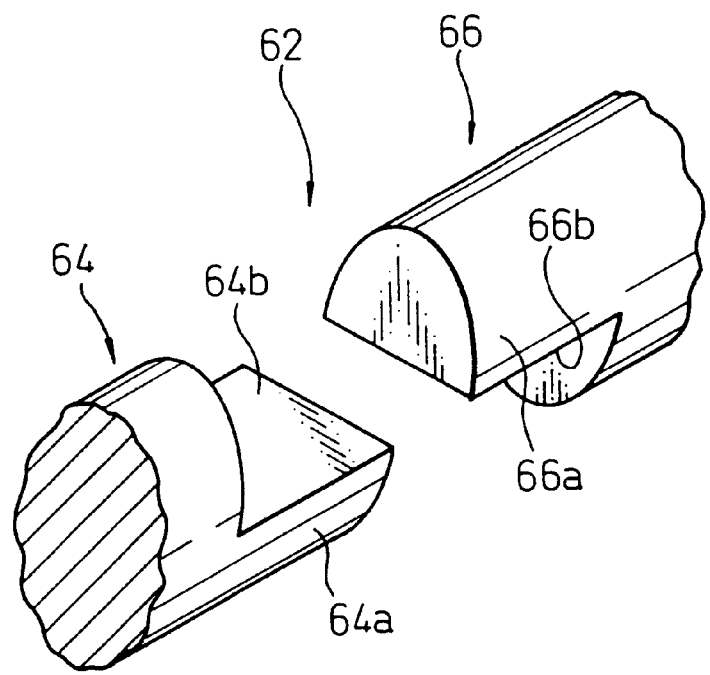
FIG. 13 is a perspective view of ends of sealing pieces which provide a sealing member in the form of a ring.
Figure 14:
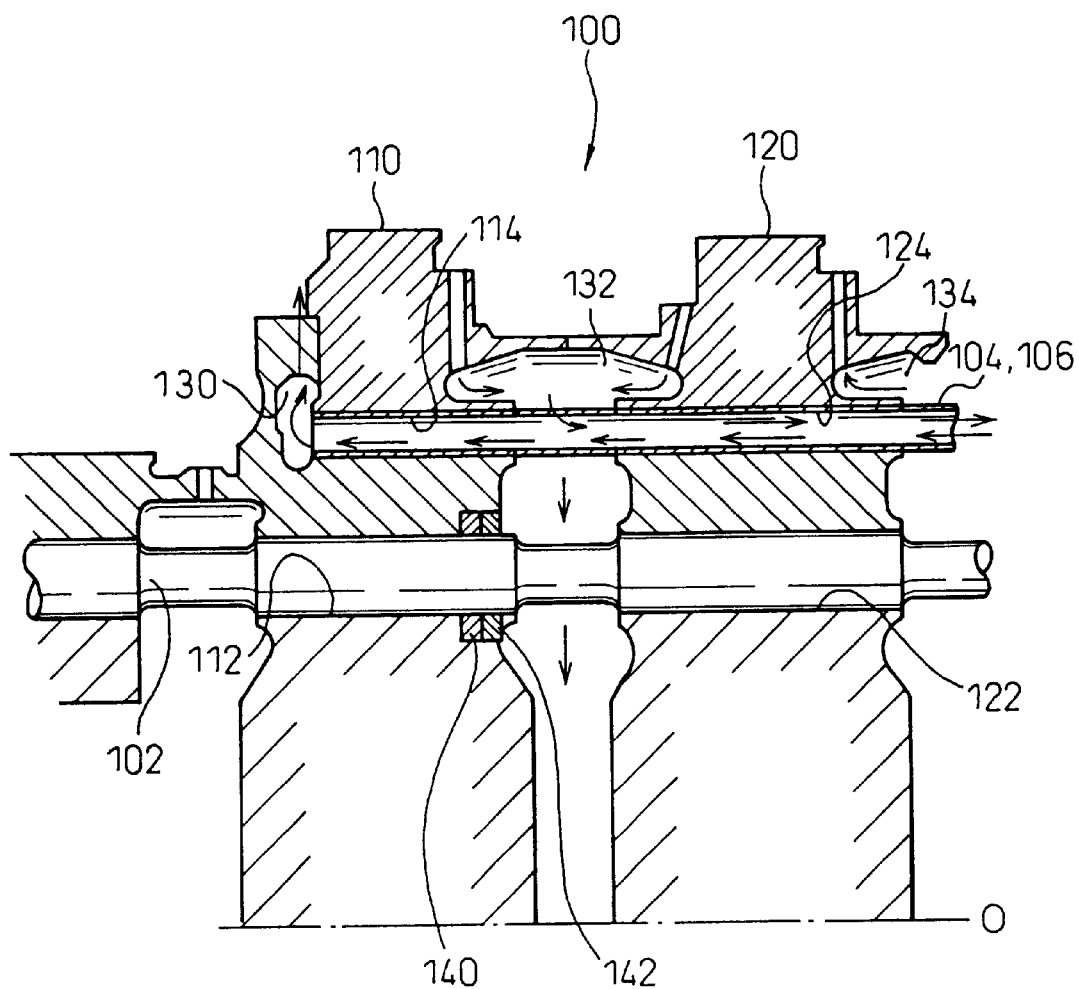
FIG. 14 is a partial section of a rotor according to a prior art, showing first and second rotor disks connected to each other.
Figure 15:
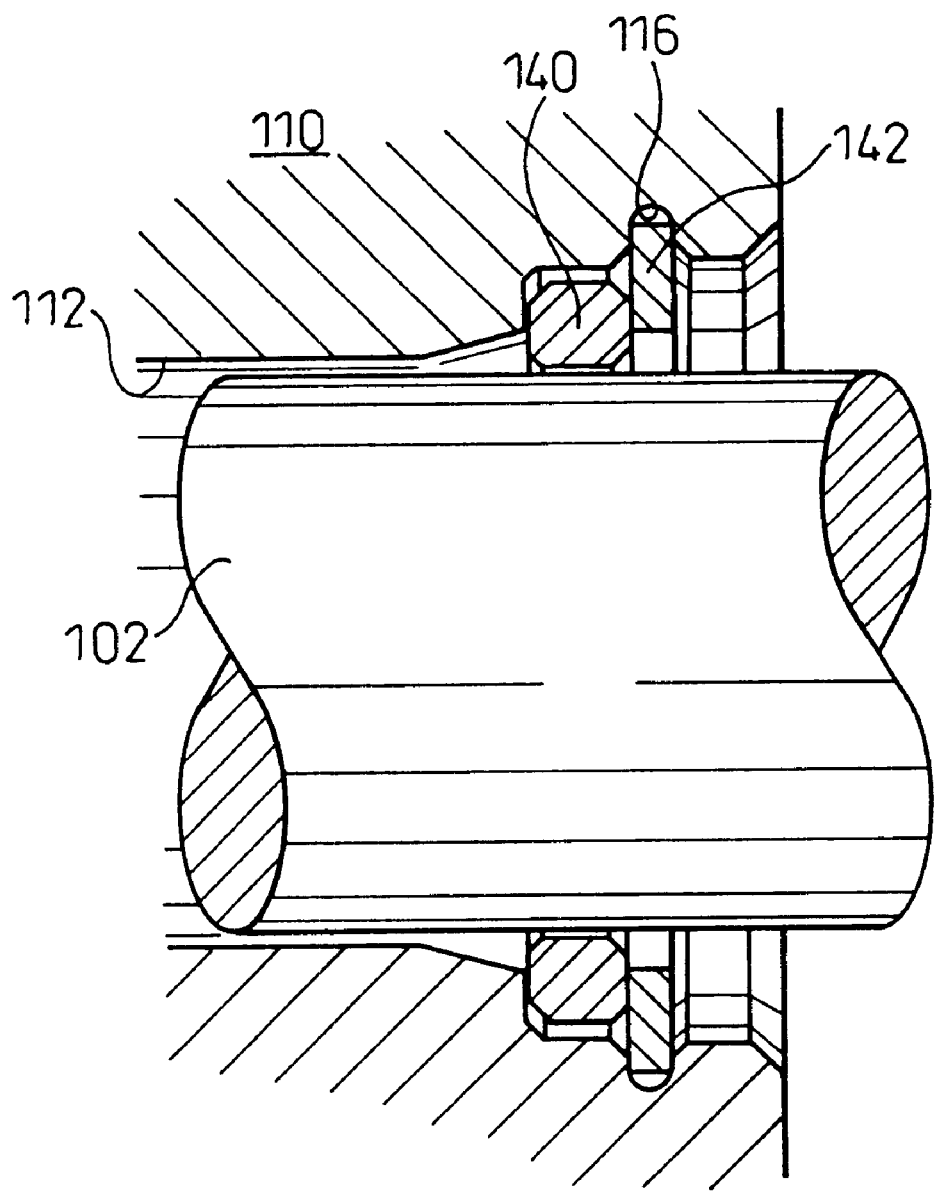
FIG. 15 is a section of an arrangement for reducing the steam leakage between the first rotor disk and the spindle bolt.

When the closure 50 is secured to the first rotor disk 210, a plurality of openings are defined between the closure 50 and first rotor disk 210 by the portions 58b and 224b as shown in FIG. 10. According to the embodiment, the steam leakage through the openings 58b and 224b is prevented by a sealing member 62 in the form of a ring disposed between the apron 54 and an annular recess 226 formed in the first rotor disk 210 at the proximal end of the catch 222. Although the sealing member can be composed of one piece ring member, the sealing member 62 may comprise a plurality of sealing pieces which allow the sealing member 62 to be divided into two, three or four pieces to facilitate the replacement of the sealing member 62. In case of the sealing member 62 made of sealing pieces, as shown in FIG. 13, ends 64a and 66a of adjacent sealing pieces 64 and 66 are cut along a plane extending through the center line of the sealing member 62 to provide configurated end portions which are complementarily joined at their sealing surfaces 64b and 66b. This ensures the sealing effect at the joints between the sealing pieces.

The operational function of the embodiment will be described.

The closure 50 is attached to the first rotor disk 210, as described above, with the sealing member 62 disposed within the annular recess 226 defined in the first rotor disk 210. When the rotor rotates as the gas turbine is activated, the centrifugal force on the closure 50 presses the sealing surface 60 of the sealing disk 50 to the sealing surface 220 of the first rotor disk 210 to prevent steam leakage therebetween.

Although, according to the embodiment shown in FIG. 13, the sealing member 62 includes sealing pieces 64 and 66 which have a circular section, the sealing member 62 may be composed of sealing pieces which substantially have a pentagonal section corresponding to the section of the annular recess 226 defined at the proximal end of the catch 222 of the first rotor disk 210. The essential point is a configuration which can contact the closure 50 and the first rotor disk 210 at two points P1 and P2.

Figure 12:
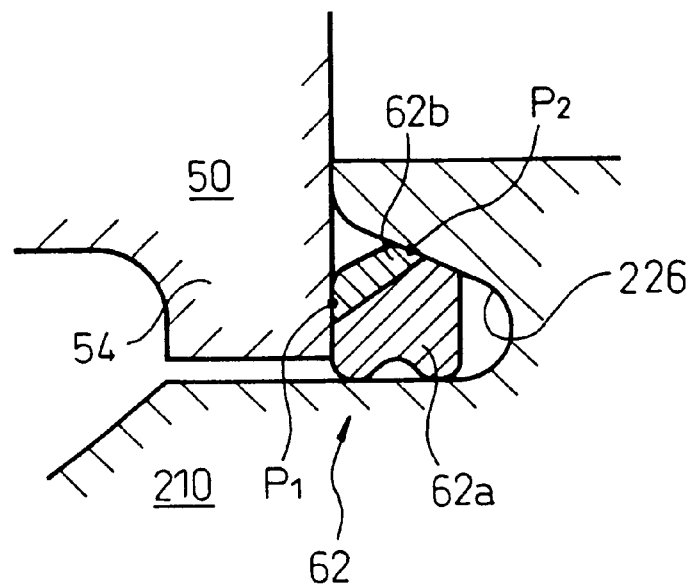
FIG. 12 is an enlarge view of a portion indicated by "C" in FIG. 11.

Further, FIG. 13 shows that the ends of the sealing pieces are cut along a plane extending through the center line thereof. However, the invention is not limited to this and the ends can be cut along a plane which does not extend the center line. The essential point is an end configuration which allows the adjacent ends of the sealing pieces to be complementarily assembled to each other. In particular, the radially outwardly positioned end 62b can be configured smaller than the radially inwardly positioned end 62a, as shown in FIG. 12. According to this feature, the radially inwardly positioned end 62a is pressed to the radially outwardly positioned end 62b due the centrifugal force when the gas turbine rotates so that the radially outwardly positioned end 62b is pressed to the inner surfaces of the annular recess 226 and the apron 54 of the closure 50 to improve the sealing effect.

It will also be understood by those skilled in the art that the forgoing description is a preferred embodiment of the disclosed device and that various changes and modifications may be made without departing from the spirit and scope of the invention.

We claim:

1. A steam-cooled gas turbine with a plurality of blades cooled by steam, comprising:
   a rotor for supporting the blades, the rotor comprising a plurality of rotor disks which include a plurality of spindle bolt holes circumferentially arranged at intervals and spindle bolts extending through the spindle bolt holes to connect the plurality of rotor disks to each other to define the rotor, the rotor including a steam supply passage extending in the rotor; a steam supply chamber, fluidly connected to the steam supply passage and the respective blades, for distributing the steam to the respective blades; a steam recovery chamber, fluidly connected to the respective blades, for equally receiving the steam used for cooling the blades; and a steam recovery passage, fluidly connected to the steam recovery chamber, for directing the steam from the steam recovery chamber to the outside of the steam-cooled gas turbine;
   a sealing member substantially in the form of a ring, disposed about each of the spindle bolts, for sealing steam leakage between the rotor and the spindle bolts;
   the rotor disk including recesses, disposed coaxially with the respective spindle bolt holes, for receiving the respective sealing member, each of the recesses having an annular bottom wall and an inner wall connected to the bottom wall, the inner wall having a diameter larger than that of the spindle bolt hole;
   a plurality of holding members for holding the sealing members in place within the respective recesses by axially clamping the sealing members and engaging with a respective inner wall of a recess of the recesses.

2. A steam-cooled gas turbine according to claim 1 wherein the holding member comprises a fastener member, which engages the inner wall of the recess, and first and second holding members, disposed at each side of the fastener member, for axially clamping the fastener member therebetween.

3. A steam-cooled gas turbine according to claim 2 wherein each of the plurality of the sealing members includes first and second end faces which are axially apart from each other; inner and outer peripheries connected to the first and second end faces; and inner and outer tapered faces, extending between the first end face and the inner and outer peripheries, for reducing area of the first end face,
   each of the sealing members being disposed within the recess to abut the bottom wall of the recess at the reduced first end face to increase the pressure between the sealing member and the bottom wall of the recess whereby the sealing effect therebetween is increased.

4. A steam-cooled gas turbine according to claim 2 wherein the fastener member comprises substantially a C-shaped member.

5. A steam-cooled gas turbine according to claim 4 wherein the C-shaped member includes an outer tapered face extending along the outer periphery; and the inner wall of the recess includes a tapered face which engages the outer tapered face of the C-shaped member.

6. A steam-cooled gas turbine according to claim 5 wherein the C-shaped member includes a plurality of protrusions disposed at an interval along the inner periphery of the C-shaped member, the protrusions defining inner tapered faces; and the first holding member having a tapered face which engages the inner tapered faces of the C-shaped member.

7. A steam-cooled gas turbine according to claim 2 wherein the first holding member includes an outer screw thread and the second holding member includes an inner screw thread which engages the outer screw thread of the first holding member when the first and second holding members are assembled; and tightening the second holding member relative to the first holding member axially clamps the fastener member therebetween.

8. An arrangement for sealing between spindle bolts and a rotor of a steam-cooled gas turbine, the steam-cooled gas turbine having a plurality of blades cooled by steam and the rotor supporting the blades, the rotor comprising a plurality of rotor disks which include a plurality of spindle bolt holes circumferentially arranged at intervals and spindle bolts extending through the spindle bolt holes to connect the plurality of rotor disks to each other to define the rotor, the rotor including a steam supply passage extending in the rotor; a steam supply chamber, fluidly connected to the steam supply passage and the respective blades, for distributing the steam to the respective blades; a steam recovery chamber, fluidly connected to the respective blades, for equally receiving the steam from the respective blade used for cooling the blades; and a steam recovery passage, fluidly connected to the steam recovery chamber, for directing the steam from the steam recovery chamber to the outside of the steam-cooled gas turbine, the arrangement comprises:

a sealing member substantially in the form of a ring, disposed about the respective spindle bolts, for sealing steam leakage between the rotor and the spindle bolts;

the rotor including recesses, disposed coaxially with the respective spindle bolt holes, for receiving said respective sealing member, each of the recesses having an annular bottom wall and an inner wall connected to the bottom wall, the inner wall having a diameter larger than that of the spindle bolt hole; and a plurality of holding members for holding the sealing members in place within the respective recesses by axially clamping the sealing members and engaging with a respective inner wall of a recess of the recesses.

9. An arrangement according to claim 8 wherein the holding member comprises a fastener member for engaging with the inner wall of the recess and first and second holding members, axially disposed at the sides of the fastener member, for axially clamping the fastener member therebetween.

10. An arrangement according to claim 9 wherein each of the plurality of the sealing members includes first and second end faces which are axially apart from each other; inner and outer peripheries connected to the first and second end faces; and inner and outer tapered faces, extending between the first end face and the inner and outer peripheries, for reducing area of the first end face, each of the sealing members being disposed within the recess to abut the bottom wall of the recess at the reduced first end face to increase the pressure between the sealing member and the bottom wall of the recess whereby the sealing effect therebetween is increased.

11. An arrangement according to claim 9 wherein the fastener member substantially comprises a C-shaped member.

12. An arrangement according to claim 11 wherein the C-shaped member includes an outer tapered face extending along the outer periphery; and the inner wall of the recess includes a tapered face which engages the outer tapered face of the C-shaped member.

13. An arrangement according to claim 12 wherein the C-shaped member includes a plurality of protrusions disposed at intervals along the inner periphery of the C-shaped member, the protrusions defining inner tapered faces; and the first holding member having a tapered face which engages the inner tapered faces of the C-shaped member.

14. An arrangement according to claim 9 wherein the first holding member includes an outer screw thread and the second holding member includes an inner screw thread which engages the outer screw thread of the first holding member when the first and second holding members are assembled; and tightening the second holding member relative to the first holding member axially clamps the fastener member therebetween.

15. A method of assembling an arrangement for sealing between spindle bolts and a rotor of a steam-cooled gas turbine, the steam-cooled gas turbine having a plurality of blades cooled by steam, the rotor supporting the blades, the rotor comprising a plurality of rotor disks which includes a plurality of spindle bolt holes circumferentially arranged at intervals and said spindle bolts respectively extending through the spindle bolt holes to connect the plurality of rotor disks to each other to define the rotor, the rotor including a steam supply passage extending in the rotor; a steam supply chamber, fluidly connected to the steam supply passage and the respective blades, for distributing the steam to the respective blades; a steam recovery chamber, fluidly connected to the respective blades, for equally receiving the steam from the respective blades used for cooling the blades; and a steam recovery passage, fluidly connected to the steam recovery chamber, for directing the steam from the steam recovery chamber to the outside of the steam-cooled gas turbine, the method comprising the steps of:

disposing an annular sealing member about each of the respective spindle bolts to abut the bottom walls of the respective recesses;

disposing a first holding member within each of the respective recesses from an axially outside portion of the sealing members to abut a respective sealing member;

disposing a fastener member between each of the respective first holding members and the recesses;

disposing a second holding member within each of the respective recesses from the axially outside of the fastener members to axially clamp the respective fastener members together with the respective first holding members.

16. A method according to claim 15 wherein the recesses define engaging portions; and the fastener members are disposed within the recesses to engage the engaging portions.

17. A method according to claim 15 wherein the first holding members include outer screw threads; and the second holding members include inner screw threads which engage the outer screw threads of the respective first holding members to press the fastener members deeply within the recesses and to clamp the fastener members between the respective first and second holding members.

18. A steam-cooled gas turbine with a plurality of blades cooled by steam, comprising:

a rotor for supporting the blades, the rotor comprising a plurality of rotor disks which includes a plurality of spindle bolt holes circumferentially arranged at intervals and spindle bolts extending through the spindle bolt holes to connect the plurality of rotor disks to each other to define the rotor, the rotor including a steam supply passage extending in the rotor; a steam supply chamber, fluidly connected to the steam supply passage and the respective blades, for distributing the steam to the respective blades; said steam supply chamber including an annular recess defined in the high pressure side end face of the rotor to be fluidly connected to the respective blades;

a catch in the form of radially outwardly extending first and second portions integrally connected to the rotor to be arranged alternatively along substantially the inner periphery of the opening of the annular recess;

a closure substantially in the form of a ring for closing the opening of the annular recess;

an engaging portion in the form of radially inwardly extending first and second portions alternatively arranged along the inner periphery of the closure; and the closure being attached to the rotor by the engagement between the catch and the engaging portion.

19. A steam-cooled gas turbine according to claim 18 wherein the radially inwardly extending first and second portions of the engaging portion are alternatively arranged at a pitch the same as that of the radially outwardly extending first and second portions of the catch to allow the closure to be axially moved when the closure is rotationally positioned so that said radially inwardly extending second portions of the engaging portion align with the radially outwardly first portions of the catch such that the closure is attached by being moved from axially outside of the rotor to an axial position where the engaging portion of the closure is axially moved beyond the catch and rotated to engage at least one of the radially inwardly extending portions of the engaging portion with the radially outwardly extending first portions of the catch.

20. A steam-cooled gas turbine according to claim 19 wherein the closure further includes an apron in the form of a ring which is coaxially provided along the inner periphery of the closure and is offset axially on a frontal side thereof from the engaging portion to axially clamp the catch of the rotor together with the engaging portion.

21. A steam-cooled gas turbine according to claim 20, further comprising a sealing member in the form of a ring, disposed between the apron and the catch when the closure is attached to the rotor, for sealing between the apron and the catch.

22. A steam-cooled gas turbine according to claim 21 wherein the sealing member is pressed to the apron and the catch by centrifugal force when the rotor rotates to increase the sealing effect between the apron and the catch.

23. A steam-cooled gas turbine according to claim 21 wherein the sealing member comprises a plurality of sealing pieces.

24. A steam-cooled gas turbine according to claim 22 wherein the sealing pieces include configured ends which are complimentarily assembled with an end of an adjacent sealing piece.

* * * * *